(12) United States Patent
Selig

(10) Patent No.: US 8,527,881 B2
(45) Date of Patent: Sep. 3, 2013

(54) ENTERPRISE WEB BROWSER EXTENSION

(75) Inventor: Roy A. Selig, Hillsborough, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 1138 days.

(21) Appl. No.: 11/978,823

(22) Filed: Oct. 30, 2007

(65) Prior Publication Data

US 2008/0184157 A1     Jul. 31, 2008

Related U.S. Application Data

(60) Provisional application No. 60/898,294, filed on Jan. 30, 2007.

(51) Int. Cl.
*G06F 3/00*            (2006.01)
*G06F 3/048*           (2013.01)
*G06F 15/16*           (2006.01)

(52) U.S. Cl.
USPC ........... 715/738; 715/781; 715/783; 709/217; 709/218; 709/219

(58) Field of Classification Search
USPC .. 715/738, 205–208, 781, 783; 709/217–219
See application file for complete search history.

(56) References Cited

U.S. PATENT DOCUMENTS

| | | | |
|---|---|---|---|
| 6,272,493 B1 * | 8/2001 | Pasquali | 709/219 |
| 6,321,209 B1 | 11/2001 | Pasquali | |
| 6,434,563 B1 | 8/2002 | Pasquali et al. | |
| 6,476,833 B1 * | 11/2002 | Moshfeghi | 715/854 |
| 6,535,882 B2 | 3/2003 | Pasquali | |
| 6,636,856 B2 | 10/2003 | Pasquali | |
| 6,658,419 B2 | 12/2003 | Pasquali | |
| 6,918,066 B2 | 7/2005 | Dutta et al. | |
| 6,931,416 B2 * | 8/2005 | Kelley et al. | 1/1 |
| 7,085,736 B2 | 8/2006 | Keezer et al. | |
| 7,089,237 B2 | 8/2006 | Turnbull et al. | |
| 7,107,264 B2 | 9/2006 | Lu | |
| 2004/0165007 A1 | 8/2004 | Shafron | |
| 2004/0205633 A1 | 10/2004 | Martinez et al. | |
| 2005/0039144 A1 | 2/2005 | Wada et al. | |
| 2005/0050462 A1 * | 3/2005 | Whittle et al. | 715/517 |
| 2005/0155027 A1 * | 7/2005 | Wei | 717/162 |
| 2005/0198220 A1 * | 9/2005 | Wada et al. | 709/220 |
| 2006/0059434 A1 | 3/2006 | Boss et al. | |
| 2006/0069617 A1 | 3/2006 | Milener et al. | |
| 2006/0143568 A1 | 6/2006 | Milener et al. | |
| 2006/0179404 A1 | 8/2006 | Yolleck et al. | |
| 2006/0184578 A1 | 8/2006 | La Rotonda et al. | |
| 2006/0184997 A1 | 8/2006 | La Rotonda et al. | |
| 2006/0224951 A1 | 10/2006 | Burke et al. | |
| 2007/0101298 A1 | 5/2007 | Yolleck et al. | |
| 2008/0082539 A1 * | 4/2008 | Doane et al. | 707/9 |

OTHER PUBLICATIONS

Wikipedia; Dashboard (software); www.en.wikipedia.com; Apr. 29, 2005; pp. 1-7.

(Continued)

*Primary Examiner* — Weilun Lo
*Assistant Examiner* — Dino Kujundzic
(74) *Attorney, Agent, or Firm* — Kraguljac Law Group LLC

(57) ABSTRACT

Systems, methodologies, media, and other embodiments associated with web browsers are described. One exemplary embodiment includes a browser extension for a web browser that can communicate with a remote web service from an enterprise application to retrieve content. The content can then be displayed in sidebar window panes within the browser.

16 Claims, 8 Drawing Sheets

(56) References Cited

OTHER PUBLICATIONS

Wikipedia; Windows Sidebar; www.en.wikipedia.org; Nov. 8, 2006; pp. 1-3.

King, Brian; What is Firefox, Published on O'Reilly Network; http://www.oreillynet.com; Sep. 26, 2005; pp. 1-7.

Xulplanet; Xul Tutorial, Ch. 4.5: Content Panels (pp. 1-3) www.xulplanet.com/tutorials/xultu; Feb. 19, 2006.

Microsoft Corp.; Browse, Shop & Search Multiple Websites at Once; http://www.microsoft.com/windows/ie/ie7/tour/fre/tabs/how.html; Apr. 2007; p. 1.

Microsoft Corp.; Windows Help and How-To; Windows Vista Help: Using Quick Tabs in Internet Explorer; http://windowshelp.microsoft.com/Apr. 2007; p. 1-2.

* cited by examiner

ENTERPRISE WEB BROWSER EXTENSION

CROSS REFERENCE TO RELATED APPLICATIONS

This application claims the benefit of U.S. Provisional Application Ser. No. 60/898,294 filed Jan. 30, 2007, which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Web browsers in popular use today lack features and tools that specifically address the needs of end-users working within web-based enterprise applications. Prior solutions required an enterprise application to deliver all of its value-added content and tools in the browser window via HTML and JavaScript written into the web page's Document Object Model (DOM). An enterprise application is typically a software application hosted on an application server which simultaneously provides services to a large number of users, typically over a computer network.

Plug-ins have traditionally been part of the browser environment for such tasks as watching Flash movies or viewing PDF documents. A different mechanism has evolved in Firefox® (a web browser supported by the Mozilla Foundation) and this mechanism is an extension manager. Extensions are packages of software code that can be installed into a Firefox® browser or other browser that add a new feature to the browser, extend existing functionality, modify a visual theme, and so on. Using extensions, new and unique browser configurations can be created.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

In one embodiment, an enterprise-ready web browser is created via a productivity pack delivered as a browser extension. Using web browser extension management mechanisms, the browser extension described herein adds features and tools to a base web browser that make an end-user more productive as they work with web-based sites and applications. These enhancements make the browser enterprise-ready, that is to say better equipped to function with enterprise applications.

In one example, the present extension provides locally constructed components that talk to remote web services. For example, if the web services include Oracle application services, the extension can be designed and pre-configured to communicate to the Oracle application services layer. In general, the extension would be designed for a particular web-based enterprise application in mind and would be delivered to clients that wished to interact with the enterprise application. Thus in one embodiment, an enterprise application can transmit a customized browser extension to a user where the extension makes the browser enterprise-ready.

Figure 2:
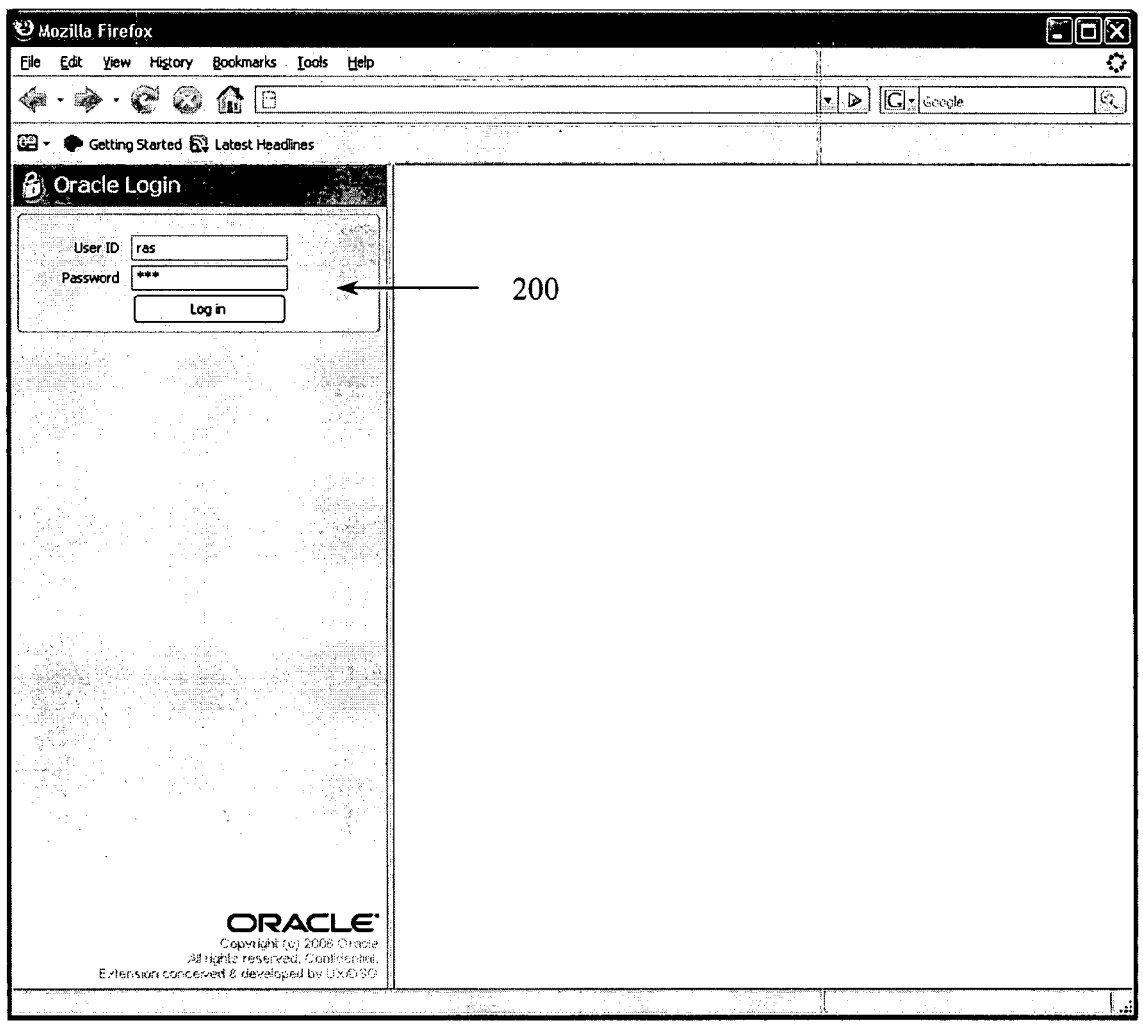
FIG. 2 illustrates an example log-in screen.

In one embodiment, the extension can permit a user to identify him/herself to the application services layer via an authentication routine (e.g. see FIG. 2). Upon authentication, user-specific and role-based content is transmitted by the application for use by the user in their browser (e.g. see FIG. 3).

DEFINITIONS

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a non-transitory medium that participates in directly or indirectly providing signals, instructions and/or data. A computer-readable medium may take forms, including, but not limited to, non-volatile media, and volatile media. Non-volatile media may include, for example, optical or magnetic disks and so on. Volatile media may include, for example, semiconductor memories, dynamic memory and the like. Common forms of a computer-readable medium include, but are not limited to, a floppy disk, a flexible disk, a hard disk, a magnetic tape, other magnetic medium, a CD-ROM, other optical medium, other physical medium with patterns of holes, a RAM, a ROM, an EPROM, a FLASH-EPROM, or other memory chip or card, a memory stick, digital signals, and other media from which a computer, a processor or other electronic device can read.

"Logic", as used herein, includes but is not limited to hardware, firmware, software embodied on a non-transitory medium and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Javascript, markup languages, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software components, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical transformations of physical quantities (e.g. change data values, change states of a component, etc). Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, transmitting, retrieving, communicating, calculating, determining, displaying, or the like, refer to actions and processes of a computer system, logic, processor, or similar electronic device that manipulates and transforms data represented as physical (electronic) quantities.

Firefox® Example

In one embodiment, the browser technology discussed herein will be described with reference to the Mozilla Firefox browser and its extension technology, which includes XUL. Of course, other types of mechanisms can be used to implement and install the present features into other types of browsers based on their applicable technologies. This will be readily understood by those of ordinary skill in the art.

"XUL" (XML User-interface Language) is a cross-platform language for describing user interfaces of applications. XUL (pronounced zool) was created to make development of the Mozilla browser easier and faster. XUL is an XML language (Extensible Markup Language) so all features available to XML are also available to XUL. There are several ways that XUL applications are created. In the Firefox browser, an extension adds functionality to the browser itself, often in the form of extra toolbars, context menus, or user interface (UI) to customize the browser UI. This is accomplished by using a feature of XUL called an overlay, which allows the UI provided from one source, in this case the Firefox browser, to be merged together with the UI from the extension. Extensions may also be applied to other Mozilla based products such as Thunderbird.

Browser Chrome

The borders of a web browser window, which include the window frames, menus, toolbars and scroll bars are referred to as the browser chrome. In order to design a page that does not require scrolling by the user, the browser chrome should be taken into consideration. For example, many web pages are designed to fit a resolution 800 pixels across. Since the window frames and scroll bar take up approximately 40 pixels, the page is often sized to 760 pixels across or less.

Chrome and Adding Extensions

Content from remote sources, regardless or whether they are HTML or XUL or another document type, are limited for security reasons in the type of operations they can perform. For this reason, Mozilla provides a method of installing content locally and registering the installed files as part of its chrome system. This allows a special URL form to be used called a chrome URL. By accessing a file using a chrome URL, the files receive elevated privileges to access local files, access preferences and bookmarks and perform other privileged operations. Typically, web pages do not get these privileges, unless they are signed with a digital certificate and the user has granted permission to perform these operations.

This chrome package registration is the way in which Firefox Extensions are able to add features to the browser. The extensions are small packages of XUL files, Javascript, style sheets and/or images packed together into a single file. This file can be created by using a ZIP utility. When the user downloads an extension, it will be installed onto the user's machine. The extension will hook into the browser using a XUL specific feature called an overlay, which allows the XUL from the extension and the XUL in the browser to combine together. To the user, it may seem like the extension has modified the browser, but in reality, the code is separate, and the extension may be uninstalled easily.

Toolbar/Sidebar Extension

The present extension adds features to a Firefox browser or other browser to give it additional functionality. The extension can add productivity tools, which are viewed as augmentations, so the tools and a user's browser can work with selected web sites, web services, or selected third party applications to improve customer productivity. In one embodiment, the present browser extension provides a toolbar/sidebar combination that can improve user productivity and make the browser enterprise ready. In another example, a window previewing feature is provided that allows the user to look into another window and get at its content.

Figure 1:
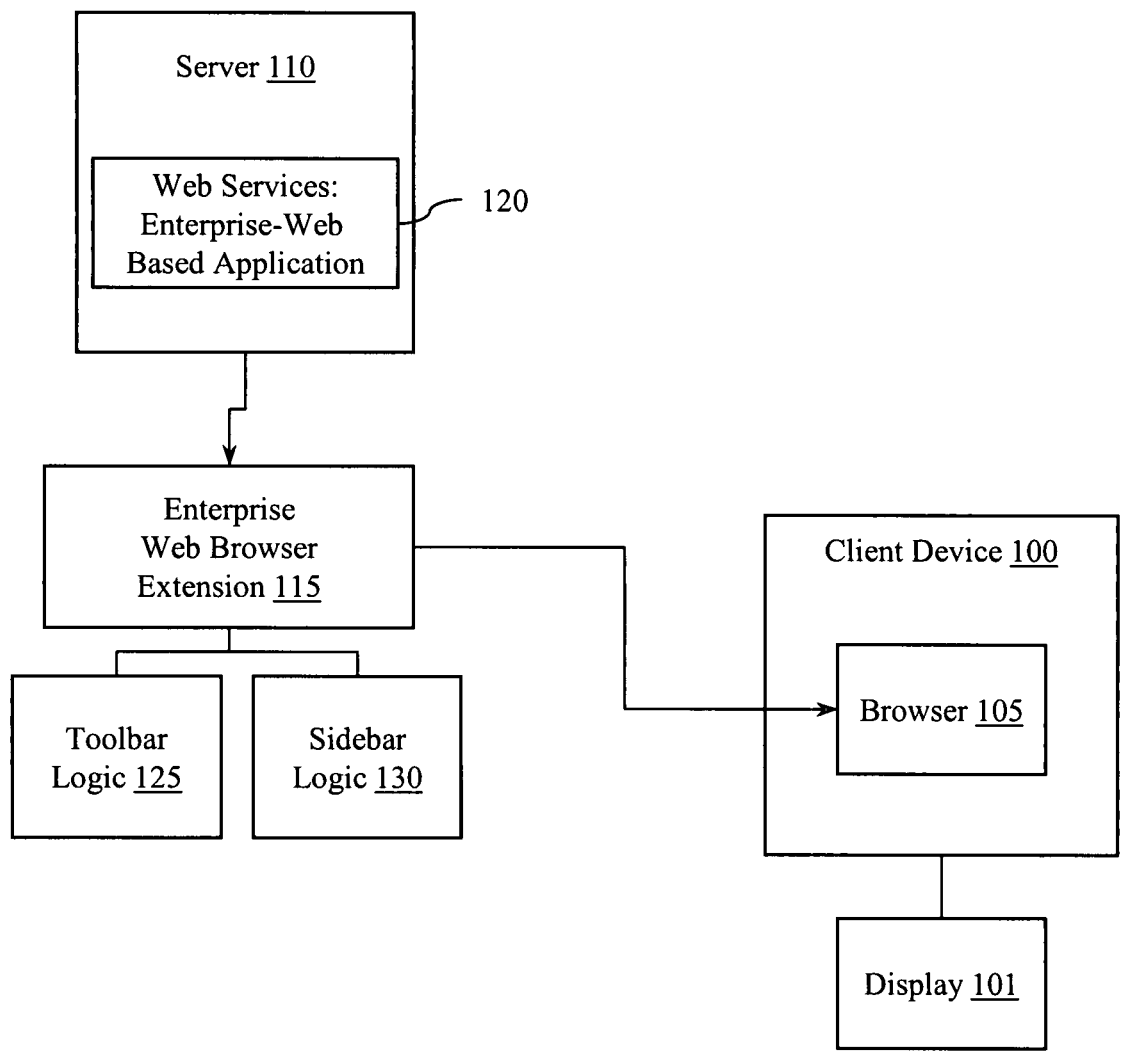
FIG. 1 illustrates an example client-server configuration where a browser extension is transmitted by the server.

With reference to FIG. 1, a client-server block diagram is shown of a client device 100 (e.g. computing device) including a display screen 101, and having a web browser 105 for communicating over a network connection to locate and access web sites. The web browser 105 includes a graphical user interface and can display web page content received from a web site on the display screen 101.

From the server-side, when a user visits the website, the server 110 delivers web pages with functionality inherent in the web pages but also a layer is added, being a browser extension 115. For example, an enterprise-based web application 120 can transmit a customized browser extension 115 including toolbar logic 125 and sidebar logic 130 to the client device 100. The extension 115 provides code that creates and displays a toolbar and sidebar that become part of the browser 105. Tools provided by the sidebar can improve the interface with the enterprise-based web application 120 and thus can improve productivity. This will be described in more detail below.

The browser extension 115 is software code (or other forms of logic) that extends the capability and functionality of the browser 105 once installed in the browser 105 (or installed to function with the browser 105). For example, the extension 115 becomes resident software code in the browser rather than being part of a web page (e.g. extension is not part of web page content that is downloaded and displayed). As such, the browser extension 115 can be selectively installed into or uninstalled from the browser 105. Furthermore since the extension 115 is designed for the enterprise application 120 of the website, the extension 115 provides the client browser 105 with an improved interface with the website. The extension 115 augments the user's web browser 105 with a new functionality that it did not possess so that users can be more productive when interacting with the enterprise application 120.

Once the extension 115 is installed, it becomes part of the browser 105 and is ready to function when the browser 105 is launched. As summarized previously, in one embodiment the extension creates a toolbar and sidebar combination that is resident in the browser but separate from the web pages and provides for the display of multiple content panes that can communicate with enterprise applications.

In one embodiment, the browser extension 115 includes toolbar logic 125 that is configured to create and display a toolbar with one or more icons on the display screen 101 of the client device 100. An icon can be configured to initiate an associated command (e.g. open/close a window, open/close a menu, initiate a task, etc.).

The browser extension 115 also includes sidebar logic 130 that is configured to perform a number of features. For example, it can communicate with a remote web service (e.g. from the enterprise application 120) to determine a group of sidebar content to display on a display screen based on a rule, and communicate with the remote web service to retrieve the group of sidebar content. The sidebar logic 130 can also display a group of sidebar windows on the display screen 101 based on the retrieved group of sidebar content. In one example, the retrieved sidebar content can include one or more different types of content and the sidebar logic 130 is configured to display a different sidebar window for containing each different type of content. Thus, a particular type of sidebar content would be displayed in an associated sidebar window that is designated for the particular type of content.

Figure 3:
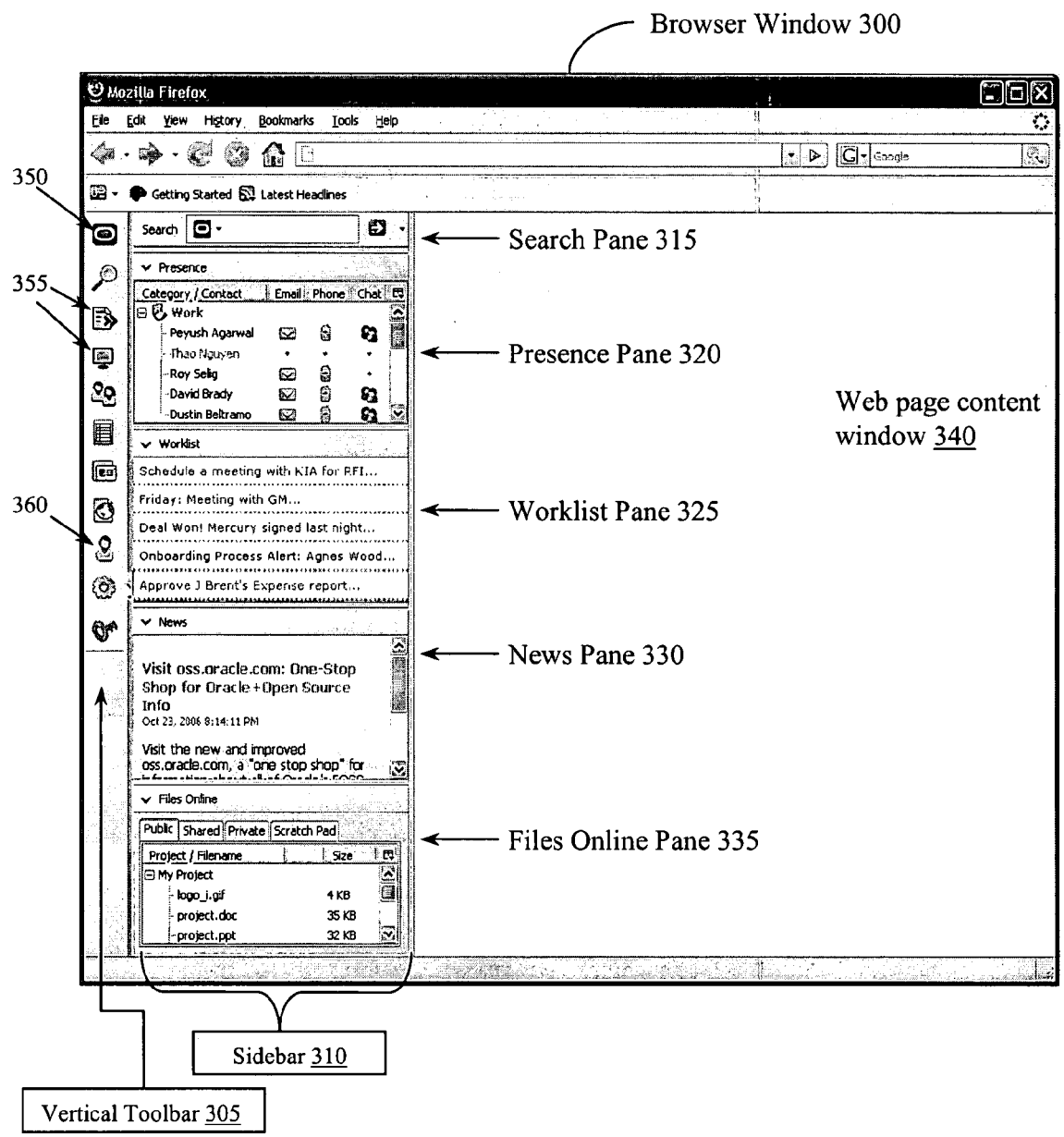
FIG. 3 illustrates an example browser window with toolbar and sidebar combination.

For example, if the retrieved sidebar content includes "news" content, then a "news" sidebar window would be displayed to contain the "news" content. If no "news" content was received, then the "news" sidebar window would not be displayed. Thus, the sidebar logic can dynamically determine what type of sidebar windows are needed based on the types of sidebar content received. In one embodiment, the types of sidebar content received can be based on a user profile that designates user-specific content for particular users. The group of sidebar windows displayed are displayed in combination with the toolbar. An example toolbar and sidebar combination is illustrated in FIG. 3.

The sidebar logic 130 can also configure one or more of the sidebar windows to communicate to one or more remote web services from the enterprise application 120 based on the sidebar content displayed therein. Using the previous example of the "news" sidebar window, communications can be established with a particular remote web service that retrieves and updates "news" content and transmits the content to the sidebar window. Other communications can also be established for retrieving other types of content from other web services.

It will be appreciated that in one embodiment the browser extension 115 is embodied as processor readable instructions on a computer-readable medium. Also, particular software code, instructions or functionality associated with the toolbar logic 125 and the sidebar logic 130 can be combined or separated as desired. They are described as separate elements herein for ease of explanation.

When the browser 105 is launched/executed, the browser detects available extensions and the extensions are executed. In this case, the web enterprise browser extension 115 is executed, which includes the toolbar logic 125 and sidebar logic 130. With reference to FIG. 2, in one embodiment, the installed extension 115 can include a graphical user interface having a login screen (e.g. login screen 200) that requests user credentials and/or user identification information (e.g. ID, password, sign-on, and the like). The credentials can be used to receive access to the web services 120 associated with the extension 115.

When a user inputs his/her user credentials/information, the extension 115 transmits the credentials to the web service 120 where it verifies/authenticates that the user has rights to the system. The web service 120 can also determine if a user profile has been associated with the user credentials. In one example, the user information is used with one or more rules to determine user-specific sidebar content that corresponds to the user information and/or is authorized to be accessed.

If the credentials are valid and authenticated properly, the web service returns a positive notice and applies the user's rights to different pieces of content. The user's rights can be pre-determined in the user's profile. When the extension 115 receives notification that the user is logged in, it can begin a query against the service or against the content using those credentials. The user-specific sidebar content is then retrieved as the group of sidebar content for this particular user. When the content is received, the sidebar logic 130 can render the content into a corresponding sidebar pane, which can be based upon the user's preference for viewing that content (e.g. certain sidebar panes collapsed or expanded).

Figure 6:
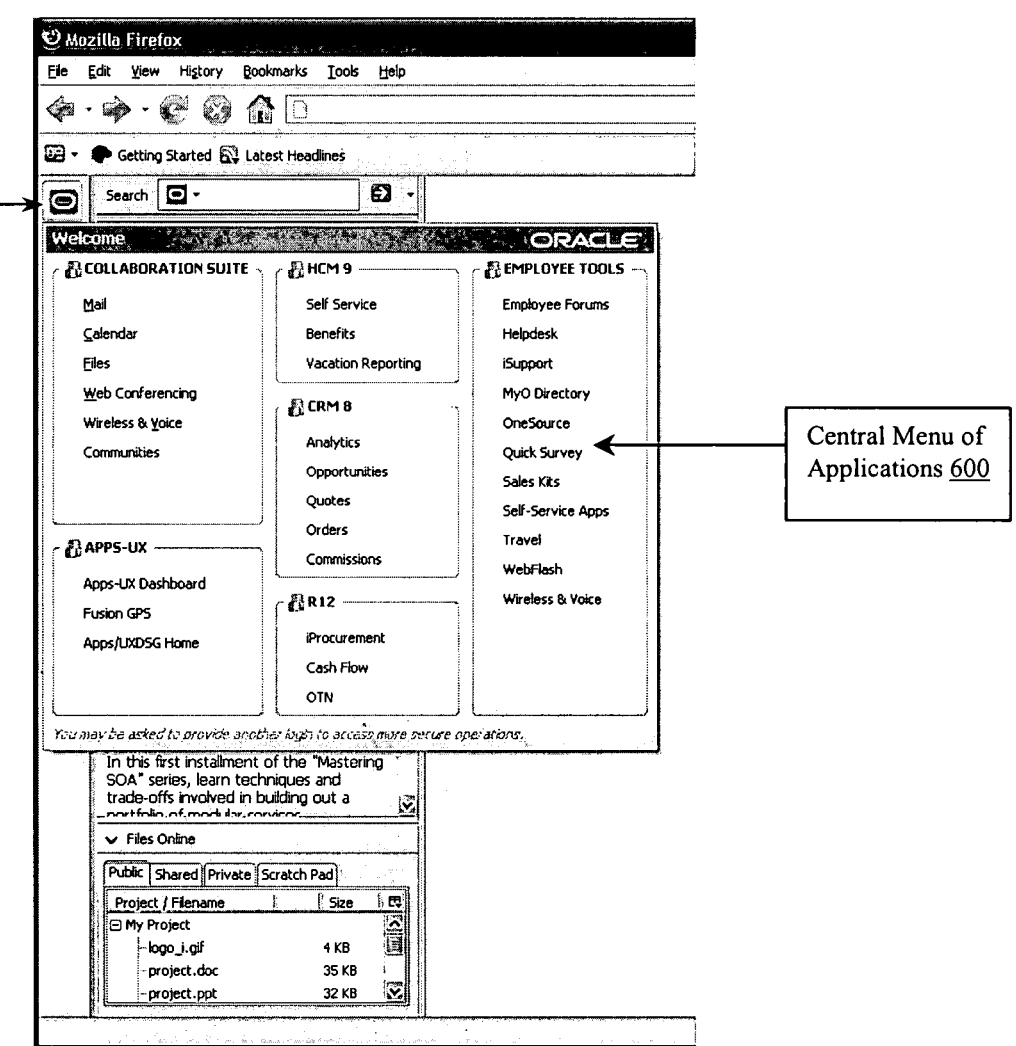
FIG. 6 illustrates an example browser display of FIG. 3 with a menu window opened from a menu icon.

For example in a tool bar, the extension can fetch menu content from the server and display a menu icon in the toolbar (e.g. "central menu" icon 350 shown in the toolbar 305 in FIG. 3). The menu icon 350 can provide menu items from the enterprise application that allow quick access to applications and/or tools from the enterprise application (e.g. see Central Menu 600 shown in FIG. 6 associated with menu icon 350). Search content can be fetched so that objects can be searched against for this particular role. Form-fill content can be fetched to determine what templates the user has available to them (e.g. based on user rights or profile) to perform form-fills onto web pages. Corresponding icons can then be created and displayed in the toolbar (e.g. form-fill icons 355 and 360 in toolbar 305 shown in FIG. 3).

The extension 115 can also at the same time substantiate each piece of sidebar content as an icon in the toolbar so that there is synchronicity between the toolbar and sidebar. This is referred to as toolbar-sidebar replication. Thus for each different sidebar window pane that is displayed, an icon is created and displayed in the toolbar so that the icons in the toolbar are synchronized with the sidebar window panes. A selected icon that is created for a selected sidebar window pane is further associated to function with the selected sidebar window pane. An example toolbar 305 and sidebar 310 are shown in FIG. 3 where each sidebar window pane (e.g. panes 315, 320, 325, 330, 335) can have an associate icon in the toolbar 305.

When searching for sidebar content, each element on the extension (e.g. each sidebar content pane that has been created) can be configured to transmit a request to a remote web service 120 associated with the content pane to determine what content is to be displayed. It will be appreciated that one portion of logic from the extension can be implemented to control the communication between the sidebar panes and its associated web service rather than having each pane do it separately. In another embodiment, the web service can automatically transmit sidebar content as designated by a rule and/or the user's profile. The extension 115 can then determine what types of content is received and display the corresponding sidebar window panes. The content is then rendered as RDF (Resource Description Framework) coming back from the web service in the XUL containers that define the content pane. RDF is a format that is implemented by XUL and is used to store data resources. Of course, other formats can be used based on the particular protocols used.

With Reference to FIG. 3, an example browser window 300 is illustrated in a logged-in state, which can be generated by the extension 115. In one example, the extension 115 can generate and display a vertical toolbar 305, which can include icons, and a sidebar 310, which includes a number of sidebar content panes with rendered content. Of course, vertical and/or horizontal orientations can be used. A fundamental difference between sidebar-type interfaces from toolbar-type interfaces is primarily one of context. The toolbar 305 is primarily implemented to function as a swift, iconic access to frequently used commands in an application interface. Sidebars are primarily implemented to enable a set of functionally important tasks to be made available to a user on a persistent basis. Sidebars also permit the full breadth of task-oriented functionality via sidebar supports, as opposed to a subset or frequently-used set, as in a toolbar implementation.

In the illustrated embodiment, the example sidebar 310 includes a search pane 315, a presence pane 320, a work list pane 325, a news pane 330, and a "files online" pane 335. In one embodiment, the number and types of panes that are display can be determined based upon a user's access rights, profile information, and/or other types of rules as described previously. Thus, the type of sidebar content that is received determines the particular sidebar window panes that are created and displayed.

Based on profile information or other desired rules, the sidebar 310 will pull back or retrieve a different set of sidebar information and create different sidebar panes for different users. For example, there may be fewer panes, or there may be more panes depending on what a user has the right to see. In this manner, one computer terminal and one browser can allow two or more users to log-in to a web service and get different content and get a different experience based on their role and/or profile information. In one embodiment, the browser extension 115 is configured to display the toolbar 305 and the group of sidebar windows 310 separate from a web page window 340 configured to display web page content by the web browser 300.

In another embodiment, the sidebar 310 is configured to function like an accordion. For example, the sidebar is configured to allow a user to manage the multiple sidebar panes by selectively collapsing and expanding the panes. The user can manipulate the panes based on what is important to the user at a particular point in time. Manipulating the panes includes collapsing some regions if they want to see more information from another region. The extension 115 is coded to provide the manipulation functions of panes.

In other words, the accordion functionality provides an ability to display more than one content instance in a space so it will share content instances in one space and allow the user to determine how much content is shown in any one content instance based on their task. Functions include both expanding and collapsing of the panes. So another way to view the sidebar 310 is a means to deliver large amounts of data in a small area where the user can determine the best way to use the data. The multiple panes of the sidebar 310 allow multiple content instances to be displayed at once. Thus, the sidebar is configured as a place where multiple content containers can be exposed simultaneously and be filled with content, for example, based on a rule. In another example, a floating sidebar mode can be provided where the sidebar 310 is created and displayed using a separate dedicated browser window separate from the browser window 300.

To communicate to a web service, a XUL template is provided that is bound to a web service on a server. The XUL template communicates and responds to the web service on the server-side to request and determine content names, content information, or other content for each sidebar pane. The Firefox and Mozilla XUL framework can be used as the interface mechanism to retrieve sidebar content and create the accordion functions with desired behaviors (e.g. expanding and collapsing the panes).

In a Firefox implementation, displayed content is XUL-based. Firefox allows code to determine the display properties of elements (e.g. location and image of icons) and, when a user clicks an icon, the code can associate a selected action like opening up a menu. The communication between the extension 115 and the browser 105 can be implemented through XUL. XUL has a mechanism that provides communication with remote web services and this allows content for the sidebar panes to be received from the remote web services 120. On the remote services side, the services can be configured to return the content in the format of RDFs (Resource Description Framework) that XUL expects and can understand. Of course, other formats can be used.

Example Methods

Figure 4:
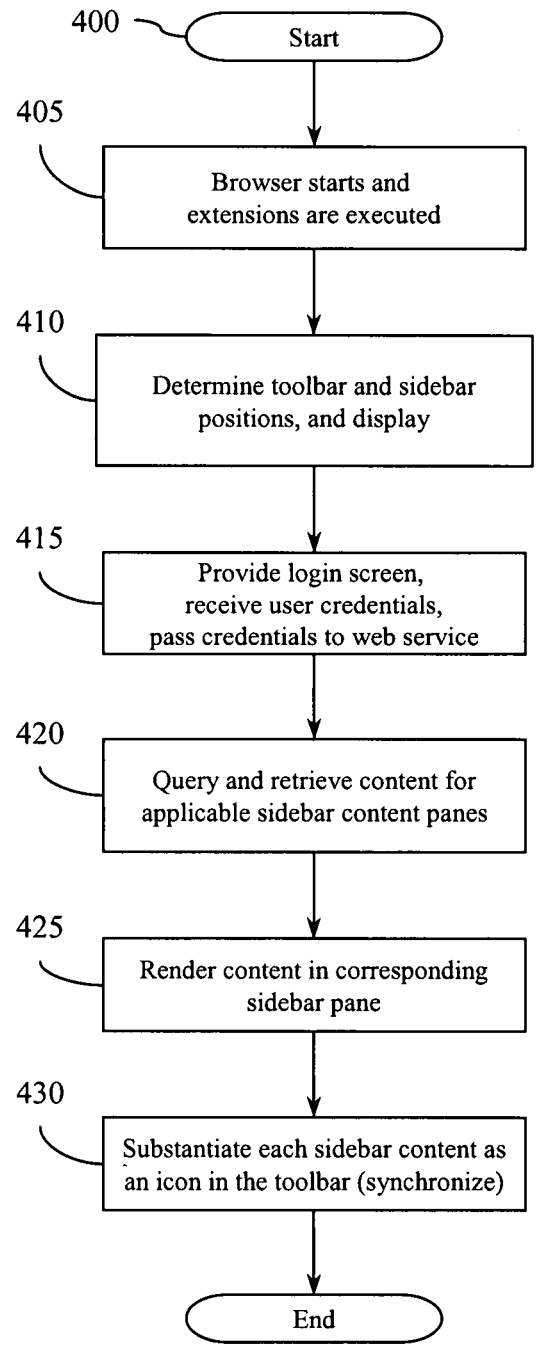
FIG. 4 illustrates an example method associated with creating the toolbar and sidebar combination.

Example methods may be better appreciated with reference to flow diagrams. For example, FIG. 4 illustrates one embodiment of a method 400 that relates to the operation of the toolbar/sidebar extension after it is installed in a browser. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

It will be appreciated that the illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methodologies can be implemented as processor executable instructions and/or operations provided by a computer-readable medium. In another example, the processing blocks may represent functions and/or actions performed by a computing device when executing the instructions. The diagram, as well as the other illustrated diagrams, are not intended to limit the implementation of the described examples. Rather, the diagrams illustrate functional information one skilled in the art could use to design, program, and generate software, or use a combination of hardware and software to perform the illustrated processing.

With reference to FIG. 4, when the browser is started, available extensions are detected and executed (block 405). In this example, the extension is the installed toolbar/sidebar extension as previously described. The process continues and determines positions within the browser window to place and display the toolbar and sidebar (block 410). The sidebar can be, for example, adjacent the toolbar. The execution of the extension can then display a login screen that includes input fields for receiving user credentials (block 415). Of course, the user credentials can be automatically retrieved from storage without requiring input from a user. Once received, the credentials can be communicated to an associated web service (e.g. the web service from which the extension was received). If the credentials are invalid, log-in to the web service is prohibited and if valid, the user is logged-in.

Once logged-in, the web service is queried for applicable sidebar content based on the user credentials or based on default content (block 420). Content that has been authorized or predefined for the user is retrieved. Based on the type of content received, corresponding sidebar panes are created and displayed in the browser window. The content for each pane is received from the server and rendered in the appropriate sidebar pane (block 425) (see also FIG. 3 for an example). After the content panes are determined, each sidebar content is substantiated as an icon in the toolbar so that the toolbar icons are synchronized with the displayed content panes (block 430).

Figure 5:
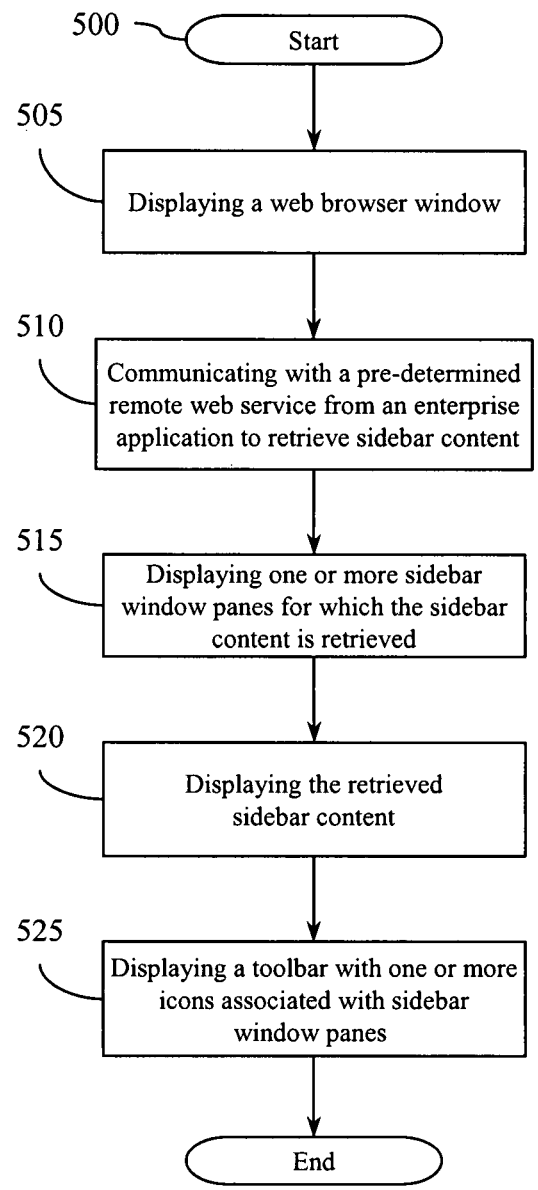
FIG. 5 illustrates an example method associated with operations of a web browser.

With reference to FIG. 5, an example methodology 500 is illustrated that is associated with a web browser configured with functions and features of the browser extension describe above. In one embodiment, the methodology can be embodied as processor executable instructions provided by a computer-readable medium where the instructions, when executed, cause a computing device to perform the method or its equivalents.

The method 500 can initiate, for example, after a web browser application is launched. The method can include displaying a web browser window on a display screen including a web page window for displaying web page content (block 505). Communication can be established with a predetermined remote web service from an enterprise application to retrieve sidebar content (block 510). One or more sidebar window panes for which the sidebar content is retrieved can then be displayed on the display screen (block 515). As previously mentioned, a different sidebar window can be displayed for each different type of sidebar content received. The retrieved sidebar content is then displayed in the corresponding sidebar window panes (block 520). The method 500 can also display, on the display screen, a toolbar with one or more icons where an icon is configured to initiate a command for an associated sidebar window pane (block 525).

In another embodiment of the method 500, the following features can be optionally performed. For example, a communication connection or path can be established between the browser for each of the sidebar window panes and one or more remote web services from an enterprise application based on the sidebar content displayed therein. In this manner, content for a particular sidebar pane can be retrieved and updated automatically.

Also, the retrieved sidebar content can be pre-designated for a user based on, for example, the user's profile and/or access rights as described previously. In this regard, the method can transmit user identification data to the remote web service that causes the remote web service to: determine a user profile associated with the user identification data, and transmit user-specific sidebar content associated with the user profile. The user-specific sidebar content would then be received by the computing device for display in one or more sidebar window panes.

In another embodiment of the method 500, where icons from the toolbar are configured to initiate a command for an associated sidebar window pane, the icon can be configured to cause a display option of the associated sidebar window pane to change values. For example, when an icon associated with a "news" pane is selected, the display of the "news" pane can change such as by displaying the pane larger, smaller, expanded, collapsed, and so on.

Figure 7:
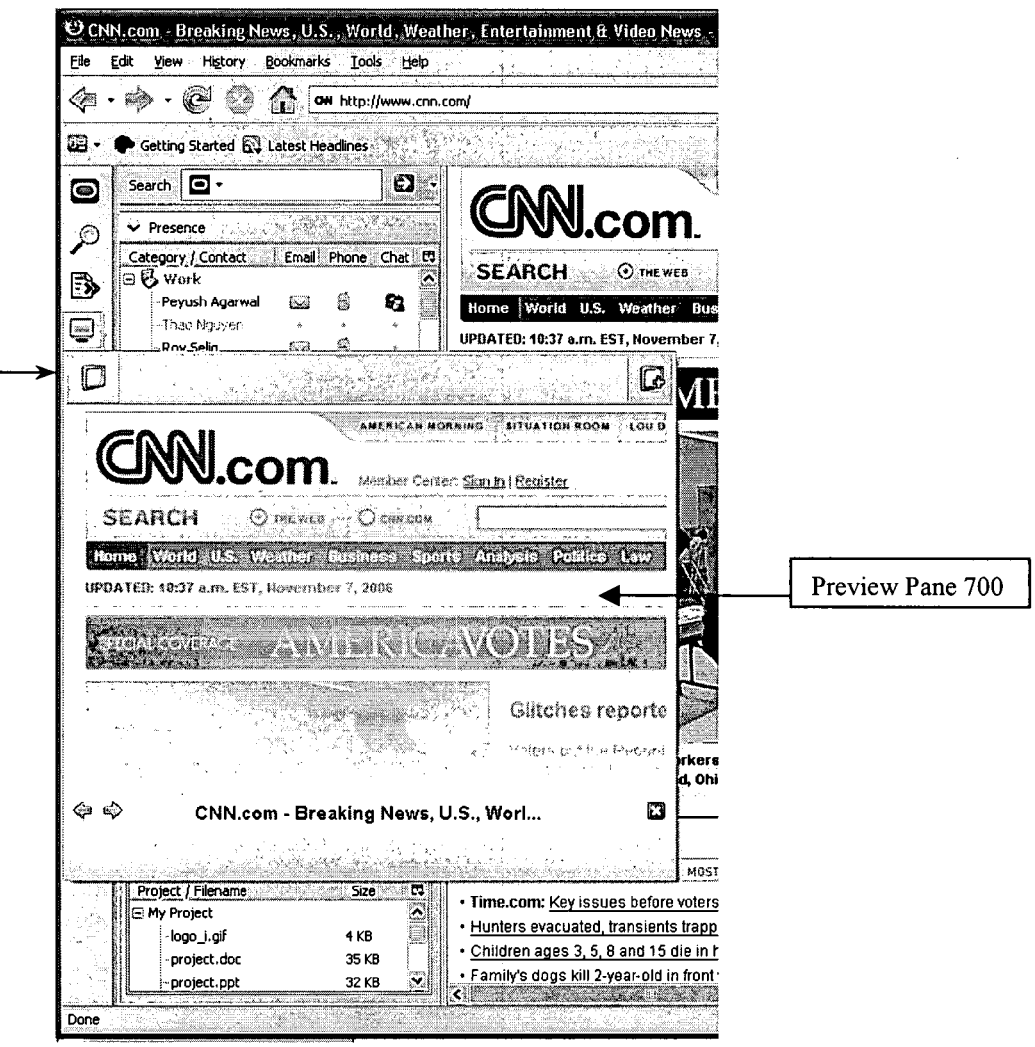
FIG. 7 illustrates an example browser display of FIG. 3 with a preview window opened from a selected preview icon.

Another associated command can be to display a preview pane that shows the content of the "news" pane or other window. For example, FIG. 7 shows an example preview pane 700 opened from a preview icon 705 that has been selected. The preview pane 700 displays the contents of another window from the browser. Thus, even when a window is hidden from a user's sight within the browser, the selection of the window's preview icon will display a view of the contents in the preview window 700 on top of other windows.

In another example, the method 500 can communicate with a web site to retrieve and display web page content within the browser window. Furthermore, the web site can be a different entity from the remote web service and the web page content would be distinct from the retrieved sidebar content. Thus, the sidebar panes can communicate with an enterprise application and its remote web services that may be part of a different site than the web sites that are being browsed.

Example Install Process

In one embodiment (based on a Firefox implementation), when a client device is browsing a website, the website may include one or more links relating to available extensions. The user may click or otherwise select the link, which would map to a URL representing the extension's physical location. A download process can then be initiated that may include the client's browser receiving notification from the server that an extension is available to be installed. It knows this, for example, via the MIME type and extension type called XPI (Cross Platform Installable File). The extension is delivered as a package, an XPI package in the form of a zip file. Using the framework that is built into Firefox, the extension is placed in the user's profile folder and an install process begins. After completing the installation, the user would restart the browser to receive the extension.

When the browser is launched, as part of the launching the browser detects available extensions and it binds the extensions to existing tool objects that are already present in the browser. For example, the toolbar is an object, which as an attachment, can be bound to many places within the browser. The extension determines places where the toolbar can be bound to and attaches itself to them. In one example, the toolbar logic of the extension determines a location to the left of the browser tag, the browser objects, and inserts the toolbar there. The sidebar logic of the extension can determine where the toolbar has just been placed and inserts the sidebar based on that location. So the toolbar and sidebar can be adjacent and relate to one another when displayed. Of course, other display formats or options can be used.

Next, the run-time code that handles the behaviors is substantiated and the extension determines that the next step is a pre-login state so a login window is displayed. One example of a login window 200 is illustrated in FIG. 2. At this point none of the features that the extension provides are available to the user. The system requests the user to log-in to a web service before the toolbar and sidebar content is received. In another variation, non-secure features of the extension could be made available to the user before login.

In another embodiment, the extension can include an options panel as an additional feature. For example, as part of the installed extension there can be an options panel which enables the user to change the mode of the toolbar/sidebar combination. The options panel can be configured to allow the user to change how the extension behaves. The options panel can be provided during installation, during execution of the browser, intermittently, or at other selected times.

With the present extension, a user interface is provided that creates a sidebar/toolbar combination that can communicate with remote web services and enterprise applications. The extension becomes resident in the browser rather than being part of or embedded in the web page(s) transmitted by the web service. Thus, an enterprise-based web application can transmit a customized extension to a user, which creates a sidebar that becomes part of the user's browser. The tools provided by the sidebar can improve the interface with the enterprise-based web application and thus convert the browser to be enterprise-ready and can improve productivity.

Being part of the browser, the extension provides a user (e.g. a customer of a web site or web application) with tools accessible to them no matter what web page they are on. As described, the tools can include the main menu, the search capability, the session preview and so on. The extension allows a user to perform work within the browser and augments the browser. The extension does not try to replace the browser in order for the user to perform enterprise application work with an enterprise application.

Figure 8:
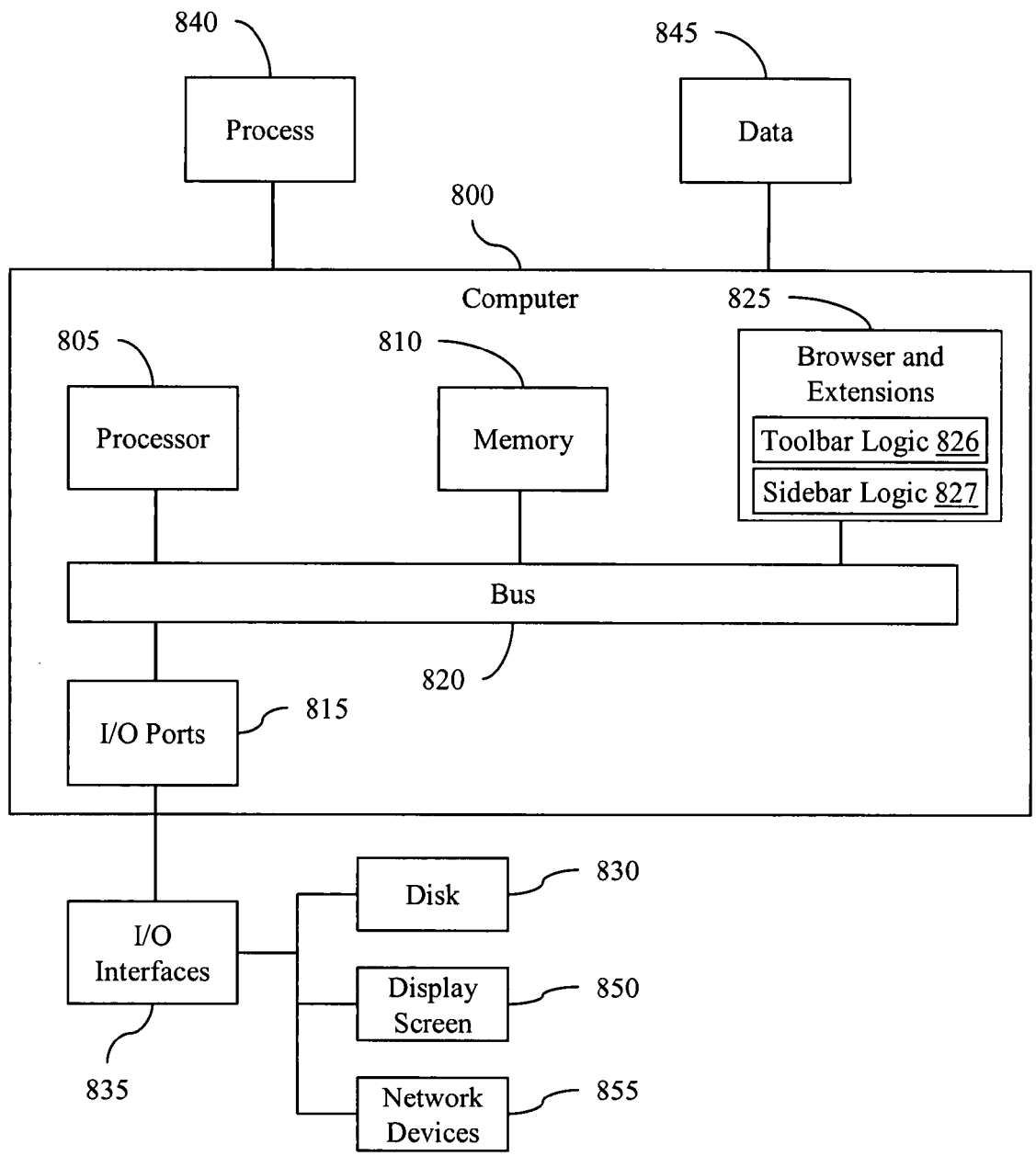
FIG. 8 illustrates an example computing environment in which example systems and methods illustrated herein can operate.

FIG. 8 illustrates an example computing device in which example systems and methods described herein, and equivalents, can operate. The example computing device may be a computer 800 that includes a processor 805, a memory 810, and input/output ports 815 operably connected by a bus 820. In one example, the computer 800 may include a web browser logic 825 configured to facilitate an enterprise-ready web browser with a browser extension described herein having toolbar and sidebar logic to implement toolbar/sidebar features. The browser 825 can be implemented similar to the browser and extensions described in FIGS. 1-5, and/or the other systems and methods described herein. Client device 100 shown in FIG. 1 can be implemented as computer 800.

In another embodiment the computing device 800 includes the web browser 825 for locating and displaying web pages from a network. The computing device 800 includes a toolbar logic 826 to create and display a toolbar with icons for initiating an associated command, and sidebar logic 827 to create and display multiple window panes in combination with the toolbar on the display screen 850. Each of the window panes can have associated code for communicating with a remote web service from an enterprise application to retrieve content from the enterprise application and display the content in the associated window pane. The multiple window panes can be displayed simultaneously within the web browser.

Generally describing an example configuration of the computer 800, the processor 805 can be a variety of various processors including dual microprocessor and other multiprocessor architectures. The memory 810 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 830 may be operably connected to the computer 800 via, for example, an input/output interface (e.g., card, device) 835 and the input/output port 815, or can be an internal component. The disk 830 can include, but is not limited to, devices like a magnetic disk drive, a solid state disk drive, a floppy disk drive, a tape drive, a Zip drive, a flash memory card, and/or a memory stick. Furthermore, the disk 830 can include optical drives like a CD-ROM, a CD recordable drive (CD-R drive), a CD rewriteable drive (CD-RW drive), and/or a digital video ROM drive (DVD ROM). The memory 810 can store processes 840 and/or data 845, for example. The disk 830 and/or memory 810 can store an operating system that controls and allocates resources of the computer 800.

The bus 820 can be a single internal bus interconnect architecture and/or other bus or mesh architectures. While a single bus is illustrated, it is to be appreciated that computer 800 may communicate with various devices, logics, and peripherals using other busses that are not illustrated (e.g., PCIE, SATA, Infiniband, 1394, USB, Ethernet). The bus 820 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 800 may interact with input/output devices via i/o interfaces 835 and input/output ports 815. Input/output devices can include, but are not limited to, a keyboard, a microphone, a pointing and selection device, cameras, video cards, the disk 830, a display screen 850, network devices 855, and the like. The input/output ports 815 can include but are not limited to, serial ports, parallel ports, and USB ports.

The computer 800 can operate in a network environment and thus may be connected to the network devices 855 via the I/O interfaces 835, and/or the I/O ports 815. Through the network devices 855, the computer 800 may interact with a network. Through the network, the computer 800 may be logically connected to remote computers. The networks with which the computer 800 may interact include, but are not limited to, a local area network (LAN), a wide area network (WAN), and other networks. The network devices 855 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 855 can connect to WAN technologies including, but not limited to, point to point links, circuit switching networks like integrated services digital networks (ISDN), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable medium storing a browser extension, for operating with a web browser on a computing device having a display screen, the browser extension comprising:

toolbar logic to create and display, on the display screen, a toolbar with icons for a group of sidebar windows, where an icon is configured to initiate an associated command; and sidebar logic to:

query a remote web service for sidebar content by sending a request over a network to the remote web service, where the request includes user credentials from a user login;

dynamically determine a number and types of the group of sidebar windows based on types of sidebar content received from the remote web service in response to the request, where the number and types of sidebar content received from the remote web service are determined from a user's access rights in an enterprise system, and where the user's access rights are verified from the user credentials in the request;

display the group of sidebar windows on the display screen where a sidebar content is displayed in an associated sidebar window of a corresponding type, the group of sidebar windows being displayed in combination with the toolbar; and configure one of the sidebar windows to communicate to one or more remote web services on behalf of the group of sidebar windows, wherein the browser extension is configured to be installed in the web browser on the computing device and executed as part of the web browser, wherein the browser extension is an Extensible Markup Language (XML) User-interface Language (XUL) extension that provides a content specific template for a type of sidebar window, and wherein the browser extension is integrated with the web browser by augmenting the web browser using an overlay to hook into the web browser and add a function associated with the content specific template.

2. The non-transitory computer-readable medium of claim 1 where the browser extension is configured to display the toolbar and the group of sidebar windows separate from a web page window configured to display web page content by the web browser, where the toolbar and the group of sidebar windows are not related to web page content in the web page window and the sidebar is rendered as part of the browser.

3. The non-transitory computer-readable medium of claim 1 where the group of sidebar windows are configured to be selectively expanded or collapsed on the display screen based, at least in part, on a rule.

4. The non-transitory computer-readable medium of claim 1 where the browser extension is embodied as processor readable instructions on the non-transitory computer-readable medium.

5. The non-transitory computer-readable medium of claim 1 where the sidebar content includes different types of sidebar content and where the sidebar logic displays a different type of sidebar window for containing each different type of sidebar content and where the type of sidebar content received from the remote web service is enterprise application content.

6. A computing device including a web browser for locating and displaying web pages from a network, the computing device comprising:
    a non-transitory computer-readable medium, which has stored thereon a browser extension comprising:
        toolbar logic to create and display a toolbar with icons for initiating an associated command; and
        sidebar logic to query, over the network, a remote enterprise application in response to detecting an installed browser extension, to dynamically determine a number and types of window panes based on a reply including sidebar content from the enterprise application, and to create and display multiple window panes in combination with the toolbar using the sidebar content, the multiple window panes being displayed simultaneously within the web browser and being integrated as part of the web browser and not as part of a web page displayed in the web browser,
    where the number and types of window panes are determined by the remote enterprise application from user rights assigned to a user for an enterprise system, and where the user rights are verified from user login information in the query,
    wherein the browser extension is configured to be installed in the web browser on the computing device and executed as part of the web browser, wherein the browser extension is an Extensible Markup Language (XML) User-interface Language (XUL) extension that provides a content specific template for a type of sidebar window, and wherein the browser extension is integrated with the web browser by augmenting the web browser using an overlay to hook into the web browser and add a function associated with the content specific template.

7. The computing device of claim 6 where the multiple window panes are configured to be selectively expanded or collapsed based on a rule and are integrated as part of a chrome of the web browser.

8. The computing device of claim 6 where the toolbar logic is further configured to create and display an icon in the toolbar for each of the multiple window panes that are displayed so that the icons in the toolbar are synchronized with the multiple window panes, where a selected icon is associated to function with a corresponding window pane.

9. The computing device of claim 6 further including a display screen.

10. A non-transitory computer-readable medium having processor executable instructions that when executed, cause a computing device to perform a method, the method comprising:
    displaying a web browser window on a display screen including a web page window for displaying web page content;
    detecting and executing a browser extension associated with the web browser window prior to loading a webpage;
    querying, over a network, a pre-determined remote web service associated with an enterprise application in response to detecting the browser extension;
    dynamically determining a number and types of sidebar window panes based on a number and types of sidebar content received in response to the querying, where the number and types of sidebar content are determined from a user's access rights verified from user login information provided in the querying;
    displaying, on the display screen, sidebar window panes corresponding to the number and types of sidebar windows;
    displaying the sidebar content in the corresponding sidebar window panes; and
    displaying, on the display screen, a toolbar with an icon for each sidebar window pane where an icon is configured to initiate a command for an associated sidebar window pane from the sidebar window panes,
    wherein displaying the web browser on the computing device includes using the browser extension that is installed in and executed as part of the web browser, wherein the browser extension is an Extensible Markup Language (XML) User-interface Language (XUL) extension that provides a content specific template for a type of sidebar window, and wherein the browser extension is integrated with the web browser by augmenting the web browser using an overlay to hook into the web browser and add a function associated with the content specific template.

11. The non-transitory computer-readable medium of claim 10 further including executable instructions to:
    establish communications between each of the sidebar window panes and one or more remote web services associated with the enterprise application based on a type of the sidebar content displayed therein.

12. The non-transitory computer-readable medium of claim 10 further including executable instructions for:
    communicating with the remote web service associated with the enterprise application to retrieve sidebar content that has been pre-designated for a user.

13. The non-transitory computer-readable medium of claim 10 where the querying the pre-determined remote web service associated with the enterprise application includes:
    transmitting user identification data to the remote web service that causes the remote web service to:
        determine a user profile associated with the user identification data; and
        transmit user-specific sidebar content associated with the user profile; and
    receiving the user-specific sidebar content for the sidebar window panes from the enterprise application based on the user profile.

14. The non-transitory computer-readable medium of claim 10 where the icon, configured to initiate the command for the associated sidebar window pane, is configured to cause a display option of the associated sidebar window pane to change values.

15. The non-transitory computer-readable medium of claim 10 further including:
communicating with a web site to retrieve and display the web page content within the browser window;
where the web site is a different entity from the remote web service, the web page content is distinct from the sidebar content, and where the browser extension is a template for a type of sidebar window.

16. A non-transitory computer-readable medium having processor executable instructions that when executed, cause a computing device to perform a method, the method comprising:
displaying a web browser window on a display screen including a web page window for displaying web page content;
authenticating a user including obtaining authentication information;
querying, over a network, a pre-determined remote web service associated with an enterprise application using the authentication information;
receiving user specific sidebar content in response to the querying and based on access rights of the user verified from the authentication information, where user specific sidebar content includes a number and types of sidebar windows;
displaying, with the web browser window, the user specific sidebar content using previously installed templates in sidebar window panes that are integrated with chrome of the web browser window and are separate from web page content; and
allowing the sidebar window panes to communicate with a remote web service to automatically update the sidebar window panes with updated sidebar content, where the user specific sidebar content and the updated sidebar content include enterprise application data,
wherein displaying the web browser on the computing device includes using a browser extension that is installed in and executed as part of the web browser, wherein the browser extension is an Extensible Markup Language (XML) User-interface Language (XUL) extension that provides a content specific template for a type of sidebar window, and wherein the browser extension is integrated with the web browser by augmenting the web browser using an overlay to hook into the web browser and add a function associated with the content specific template.

* * * * *

UNITED STATES PATENT AND TRADEMARK OFFICE
CERTIFICATE OF CORRECTION

PATENT NO. : 8,527,881 B2
APPLICATION NO. : 11/978823
DATED : September 3, 2013
INVENTOR(S) : Selig Page 1 of 1

It is certified that error appears in the above-identified patent and that said Letters Patent is hereby corrected as shown below:

In the Specifications

In column 3, line 63, delete "servelet," and insert -- servlet, --, therefor.

Signed and Sealed this
Seventeenth Day of December, 2013

Margaret A. Focarino
*Commissioner for Patents of the United States Patent and Trademark Office*